United States Patent [19]
Seki et al.

[11] Patent Number: 5,838,839
[45] Date of Patent: Nov. 17, 1998

[54] IMAGE RECOGNITION METHOD

[75] Inventors: Susumu Seki, Chiba; Shigeki Nagaya; Ryuichi Oka, both of Ibaraki, all of Japan

[73] Assignees: Sharp Kabushiki Kaisha, Osaka; Hitachi, Ltd., Tokyo; Real World Computing Partnership, Ibaraki, all of Japan

[21] Appl. No.: 672,759

[22] Filed: Jun. 28, 1996

[30] Foreign Application Priority Data

Dec. 1, 1995 [JP] Japan ................................. 7-313838

[51] Int. Cl.$^6$ ...................................... G06K 9/32
[52] U.S. Cl. ..................... 382/299; 382/205; 382/278
[58] Field of Search ................... 382/278, 276, 382/298, 300, 299, 190, 205, 114, 281, 206, 240, 148, 218; 364/728.03, 728.07; 345/132; 342/189

[56] References Cited

U.S. PATENT DOCUMENTS

| | | | |
|---|---|---|---|
| 5,007,101 | 4/1991 | Iwahashi et al. | 382/42 |
| 5,220,441 | 6/1993 | Gerstenberger | 358/487 |
| 5,440,312 | 8/1995 | Anderson | 342/189 |
| 5,550,937 | 8/1996 | Bell et al. | 382/293 |
| 5,619,596 | 4/1997 | Iwaki et al. | 382/278 |
| 5,638,465 | 6/1997 | Sano et al. | 382/281 |
| 5,640,468 | 6/1997 | Hsu | 382/190 |

OTHER PUBLICATIONS

"Gesture Recognition using Multiple–resolution Feature of Motion Images", Seki et al; pp. S–9 through S–13.
"A Face Recognition Method Using Higher Order Local Autocorreclation And Multivariate Analysis", Kurita et al, pp. 213–216.
"Pattern Recognition and Understanding", PRU 95-79-'102, IEICE Technical Report, Institute of Electronics, Information and Communication Engineers (IEICE).

*Primary Examiner*—Leo H. Boudreau
*Assistant Examiner*—Kanji Patel
*Attorney, Agent, or Firm*—Nixon & Vanderhye P.C.

[57] ABSTRACT

The present invention is intended to provide an image recognition method which, in recognizing an input image including an object presumable to have continuity like a human figure, enables simultaneously detecting the shape of the object in the input image and cutting-out the object therefrom, and obtaining information on position of the object at the same time, and which also enables recognition of two objects having the same shape but having different sizes. The processing procedure of image recognition according to the present invention consists of: inputting an input frame image of an object by image data inputting means; preparing scaled-down images 1 to n at different resolutions by image size reducing means; calculating neighborhood correlation values for respective scaled-down images 1 to n by neighborhood correlation processing means and checking relationship between them at the same time; calculating the area and the gravity center of each image using pixel values and pixel coordinate value; identifying respective objects at respective resolution on the basis of their relationship; determining shape correlation of each object; and recognizing the shape of each object by comparing the obtained shape auto-correlation with a previously determined reference value.

3 Claims, 7 Drawing Sheets

IMAGE RECOGNITION METHOD

BACKGROUND OF THE INVENTION

The present invention relates to an image recognition method which can determine the number of objects to be recognized and their relative positions in an input image, for example, a picture taken by a camera and, at the same time, can identify shape of each object by comparing its auto-correlation function with that of a reference image previously stored in storing means.

A method for recognizing a shape feature of an object in an image independent of its location by generating an image which differs by resolution from an input image and determining a higher order local auto-correlation using a mask of 3 by 3 pixels was proposed by T. Kurita, et al., "A Face Recognition Method Using Higher Order Local Auto-correlation And Multivariate Analysis" by T. Kurita, N.Otsu and T. Sato, pp. 213–216, ICPR, 1992. This method enables recognition of a very small shape of any object by separately distinguishing a small scale feature and a large scale feature.

The above-mentioned method, however, has the following drawbacks:

To recognize a plurality of objects coexisting in an image, it is necessary to first cut-out separate rectangles including respective targets. This may complicate image recognition processing.

Information on position of any object in an image, if necessary, must be separately determined because the object shape is determined independent of its location.

To recognize an object that is identical in shape but different in size from a reference model, the image must be normalized to meet with the required size.

SUMMARY OF THE INVENTION

The present invention is intended to provide an image recognition method in which recognizing an input image including an object presumed to have continuity like a human body, enables simultaneously detecting the shape of the object in the input image and cutting-out the object therefrom, and obtaining information on position of the object at the same time and which enables, furthermore, recognition of two objects having the same shape but having different sizes.

The first object of the present invention is to provide an image recognition method for recognizing an input image by determining shape auto-correlation of an object therein by changing resolution of the input image data and by comparing the determined shape auto-correlation with a shape auto-correlation of a previously stored reference shape, which is capable of determining neighborhood correlation for the object at each image resolution; cutting-out the object therefrom by using the determined neighborhood correlation; determining shape auto-correlation of each object cut-out from the image by using the determined neighborhood correlation; and obtaining multiple resolution features, and which is capable of extracting each of the objects existing in an input image by examining connections between neighboring pixels and determining correlation values by using the multiple resolution features and recognizing shape of every extracted objects at the same time, thus simplifying the image recognition processing.

The second object of the present invention is to provide an image recognition method defined in the first object of the present invention, which further enables simultaneously detecting a shape feature of each object and information on its position by storing coordinate information of each pixel of each object detectable in the input image while detecting the neighborhood correlation of the object, and which also enables recognition of the relationship between a plurality of coexisting objects by simultaneously detecting correlation and relative position such as gravity centers of the respective objects.

The third object of the present invention is to provide an image recognition method defined in the first object of the present invention, which further enables recognition of two objects having different sizes but having the same shape from each other (i.e., pure recognition of only shape feature) by taking logarithms of shape auto-correlation functions in comparing the detected shape auto-correlation with the reference shape.

PREFERRED EMBODIMENT OF THE INVENTION

Figure 1:
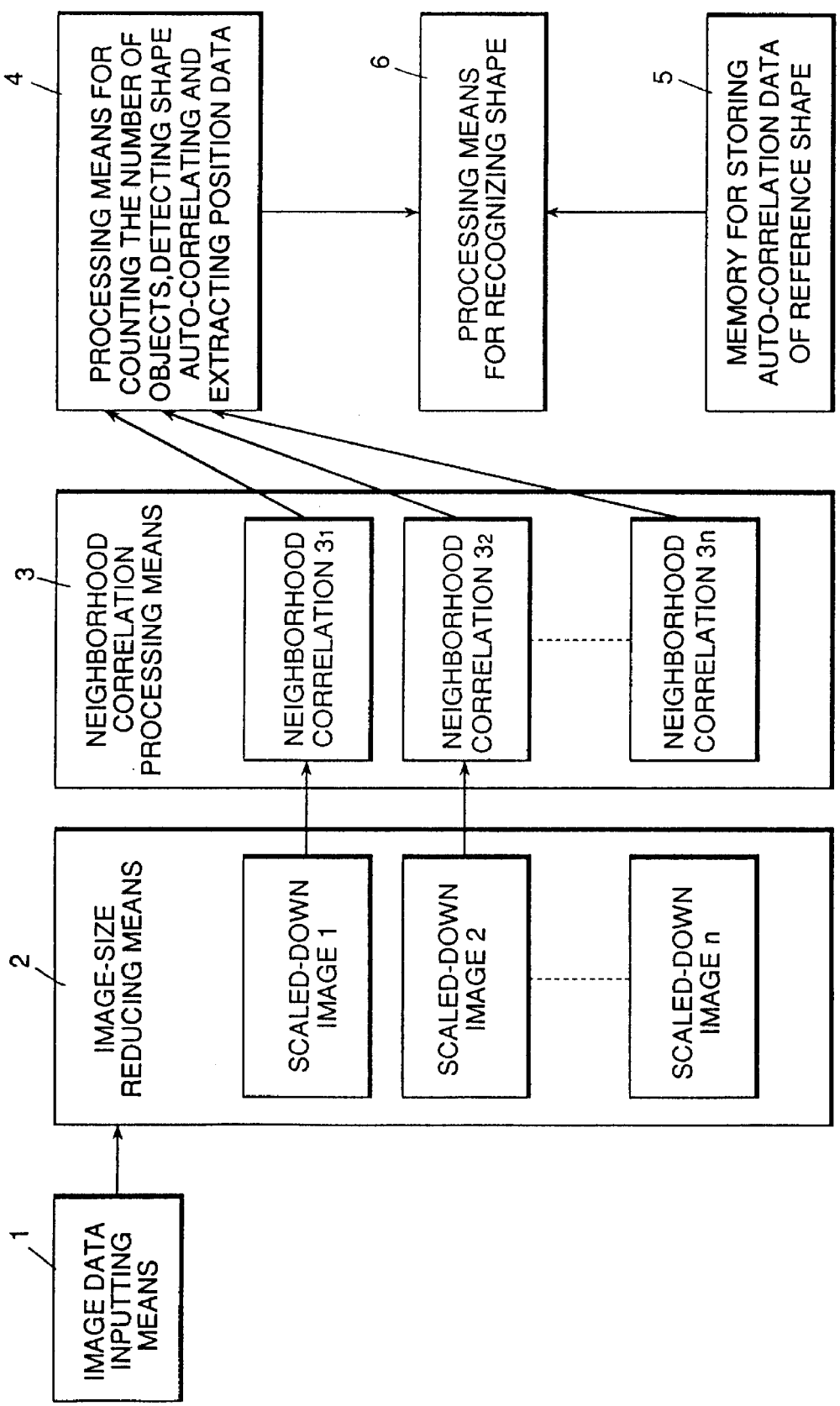
FIG. 1 is a schematic construction diagram of an exemplified image recognizing system embodying the image recognition method according to the present invention.

A preferred embodiment of the present invention will be described below with reference to the accompanying drawings:

FIG. 1 is a schematic construction diagram of an exemplified image recognizing system based on the image recognition method according to the present invention.

An input image (data) inputted by image data inputting means 1 has, for example, an image size of L'M pixels, each pixel being of 8 bits. The input image is converted by image-size reducing means to scaled-down images 1–n of different resolutions 1–n. These scaled-down images 1–n have, for example, respective image sizes of $(L/r_1) \times (M/r_1)$ to $(L/r_n) \times (M/r_n)$ at resolutions of $r_1$ to rn on the condition that 1 pixel is represented by 32 bits with floating point representation. A memory 5 for storing auto-correlation data of reference shapes has 32 bits per pixel (n×p×9, where p is the number of reference operations).

Figure 2:
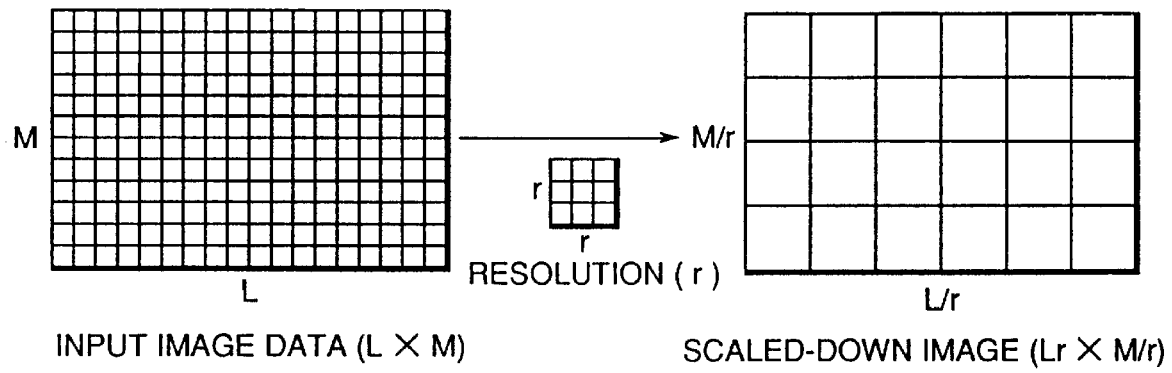
FIG. 2 shows an example of producing a scaled-down image at resolution (r).

FIG. 2 shows an example of generating a scaled-down image at resolution (r).

As shown in FIG. 2, the image-size reducing means 2 produces a series of scaled-down (reduced in size) images of $(L/r_1) \times (M/r_1)$ to $(L/r_n) \times (M/r_n)$ by respectively summing square pixel areas of $r_1 \times r_1$ to $r_n \times r_n$ according to n kinds of resolutions from $r_1$ to $r_n$.

To examine the relationship between a remarkable pixel and each of 8 neighboring pixels for each of the scaled-down images 1 to n, the product of the remarkable pixel value and each neighboring pixel value is calculated.

Figure 3:
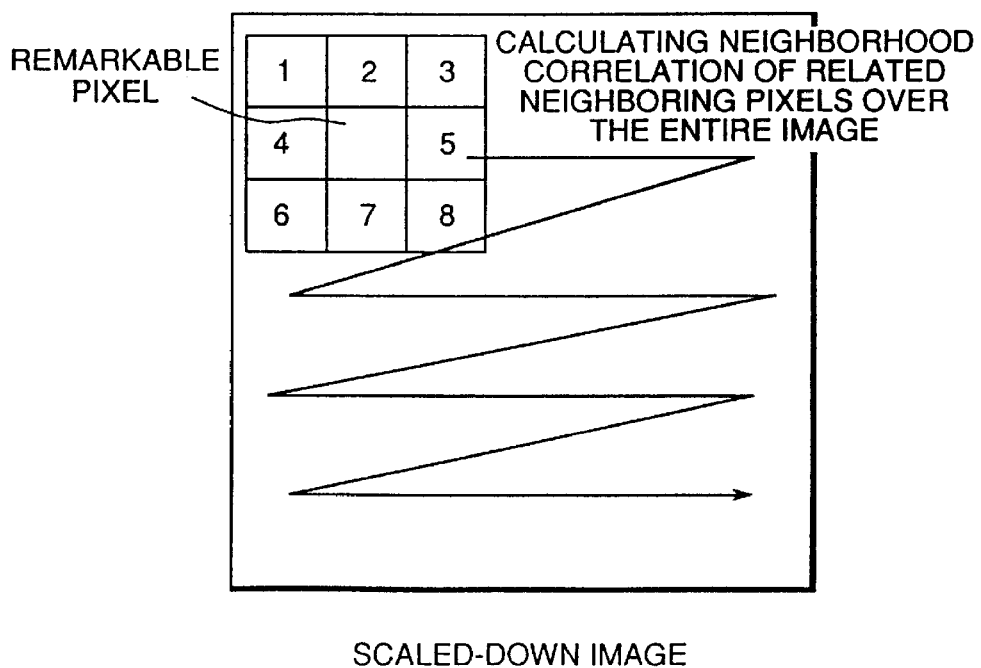
FIG. 3 represents the concept of neighborhood correlation over a scaled-down entire image.

FIG. 3 schematically illustrates how to perform the above-mentioned pixel-value calculations over an entire scale-down image.

Taking a pixel at a point (i,j) with value P(i,j; r) of an image at resolution r, these calculations at the point (i,j) are expressed as follows:

$$C(i,j; r) = \begin{bmatrix} P(i,j; r)P(i-1,j-1; r) \\ P(i,j; r)P(i-1,j; r) \\ P(i,j; r)P(i-1,j+1; r) \\ P(i,j; r)P(i,j-1; r) \\ P(i,j; r)P(i,j+1; r) \\ P(i,j; r)P(i+1,j-1; r) \\ P(i,j; r)P(i+1,j; r) \\ P(i,j; r)P(i+1,j+1; r) \end{bmatrix} \quad (1)$$

The neighborhood correlation is defined as a function (vector) C(i,j; r) which has 8 variables depending on the relative positions (coordinate values) of the pixels at each resolution of each image. In the example of FIG. 1, the neighborhood correlation processing means calculates the neighborhood correlations $3_1$–$3_n$ for each of the scaled-down images 1–n obtained by the image-size reducing means.

The neighborhood correlations $3_1$–$3_n$ thus determined represent the pixel's relationship to neighboring pixels: The remarkable pixel is considered to be connected to a surrounding pixel if the correlation value is not zero. Namely, both pixels are judged to be of the same object.

Every object is thus extracted from the input image and the number of different extracted objects is expressed as K(r).

The product values of every 8 neighboring pixels belonging to the extracted area of the same object are summed up in each direction. The obtained sum is defined as shape correlation value (coefficient) X(r; the same object) of the object at a certain resolution r.

$$X(r; \text{the same object}) = \Sigma C(i,j; r; \text{the same object}) \quad (2)$$

At the same time with calculation of the neighborhood correlations, a sum of pixel values for the same object is determined as area A(r; the same object) of the object.

$$A(r; \text{the same object}) = \Sigma P(i,j; r; \text{the same object}) \quad (3)$$

The gravity center G(r; the same object) of the object is calculated from the relative locations of pixels and the pixel values.

$$G(r; \text{the same object}) = (\Sigma(i,j) \ P(i,j; r; \text{the same object}))/A(r; \text{the same object}) \quad (4)$$

Calculations for determining values X(r; the same object), A(r; the same object) and G(r; the same object) are conducted for every pixel in an image. Consequently, processing is performed at a time on each resolution image.

In FIG. 1, the means 4 for counting the number of objects, determining shape auto-correlations and extracting positions of the objects performs the following operations:

The means 4 compares the number K(r) of objects at different resolutions. If the number of different resolution images with the same value K(r) is more than a certain value, noise of images in the range of the resolutions may be considered to be small.

Accordingly, said resolution range is judged to be a range of different resolution images for determining shapes of objects, and the number of distinguished objects is also determined as the number of actual objects.

Within this resolution range, the same objects at different resolutions are identified according to their relative positions.

An area of each object at the highest resolution is defined as the object area and the center of gravity thereof is defined as the object's gravity center.

Shape auto-correlation of each object, which approximates to a usual auto-correlation function, is determined as a function of resolution. A combination of the shape auto-correlation and the neighborhood correlation is called as a multiple resolution feature.

The processing means for recognizing shape 6 shown in FIG. 1 recognizes the shape of each object on the basis of data previously stored in the reference shape auto-correlation data memory 5. Where it is desired to recognize two identical objects of different sizes as different objects, the shape auto-correlation of the object is directly compared with that of the standard shape.

Where it is necessary to recognize two objects having the same shape but having different sizes as the same object, the logarithms of their auto-correlations, and the logarithms of the resolutions (see the following expression (5)) are taken and a difference between the logarithms is determined.

$$\frac{d\log(X(r))}{d\log(r)} \quad (5)$$

This operation can eliminate the scale effect of the image.

Figure 4:
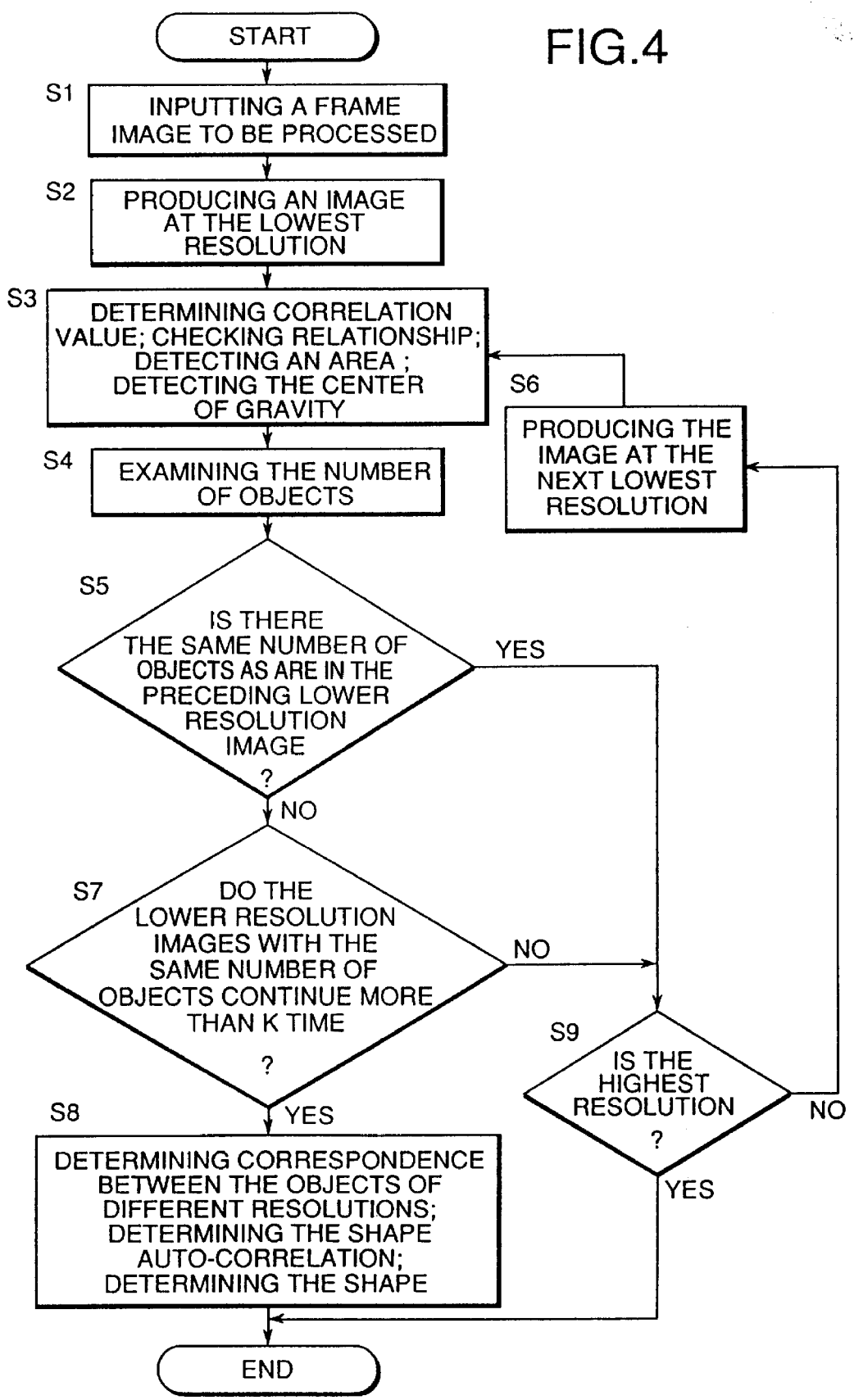
FIG. 4 is a flowchart showing the processing operations in an embodiment of the image recognition method according to the present invention.

FIG. 4 is a flowchart showing the above-described processing operations.

In FIG. 4, a frame image to be analyzed is first inputted by an image data inputting means of an image pick-up device (Step S1). An image at the lowest resolution is produced (Step S2). The relationship of the produced image to an image at a next resolution is determined by calculating the correlation values. At the same time, an area of an object is determined by using pixel values and its gravity center is also determined by using the pixel values and relative positions of the pixels (Step S3).

The number of objects is examined according to the relationship (Step S4). The number of objects is checked to determine whether it is the same as is in the image of the next lower resolution (Step S5). If the number of objects is the same in two low-resolution images (Step S9), another higher resolution image is produced (Step S6) and the same processing is conducted. If the same number of objects exists in the highest resolution image, the processing ends.

If the number of objects in an image at a low resolution is different from that in an image at next low resolution (Step S7) and the resolution range of the images with the same number of objects exceeds an threshold K (Step S8), matching of the same objects is carried-out between the images of said resolution range, the auto-correlations are determined, the shape is recognized (Step S8) and the processing is finished.

Figure 5:
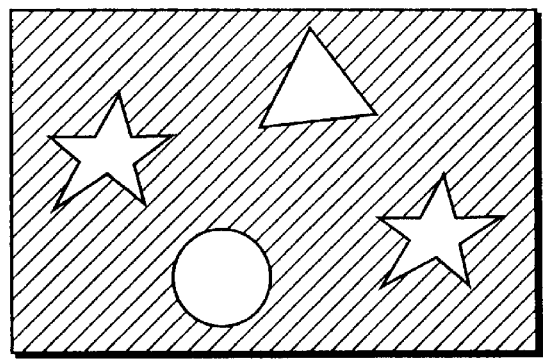
FIG. 5 shows an input image including 4 patterns used for an experiment.

To examine the effectiveness of the obtained shape auto-correlation for recognizing shapes and the capacity of the obtained neighborhood correlation for extracting objects, the applicant made the following experiments:

FIG. 5 shows an input image including 4 patterns used for the experiment made by the applicant. The leftmost pattern ☆ is hereinafter called as Star 1 and the rightmost pattern ☆ is called as Star 2.

Figure 6:
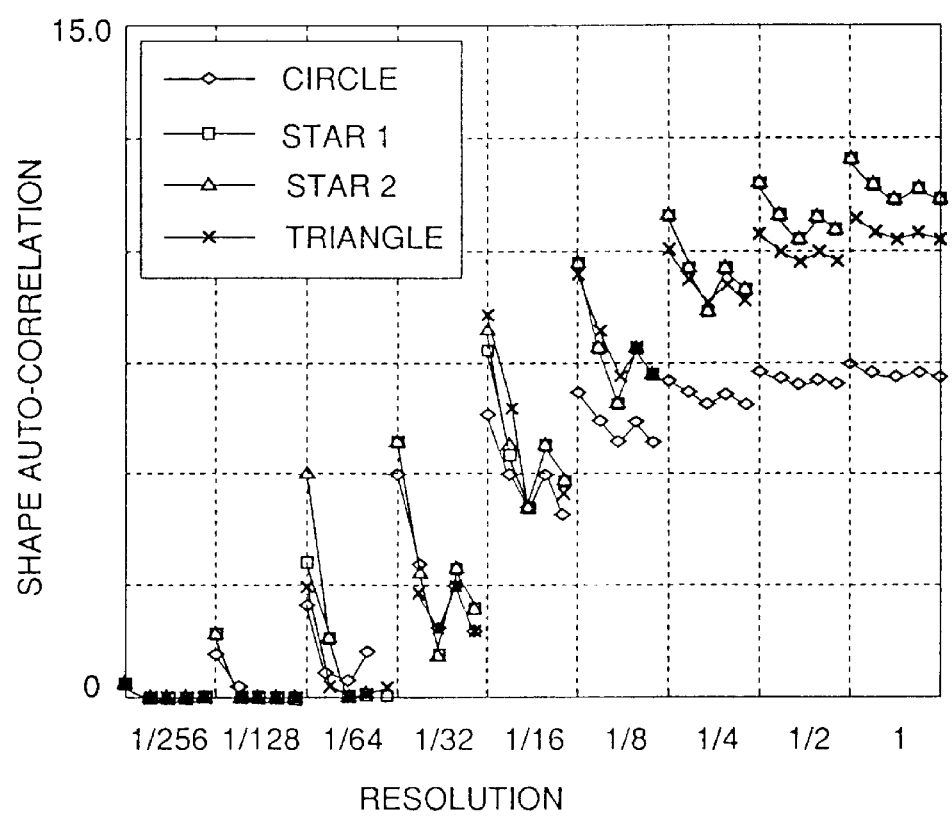
FIG. 6 is a graph showing a result of shape auto-correlation of 4 patterns used for an experiment.
Figure 7:
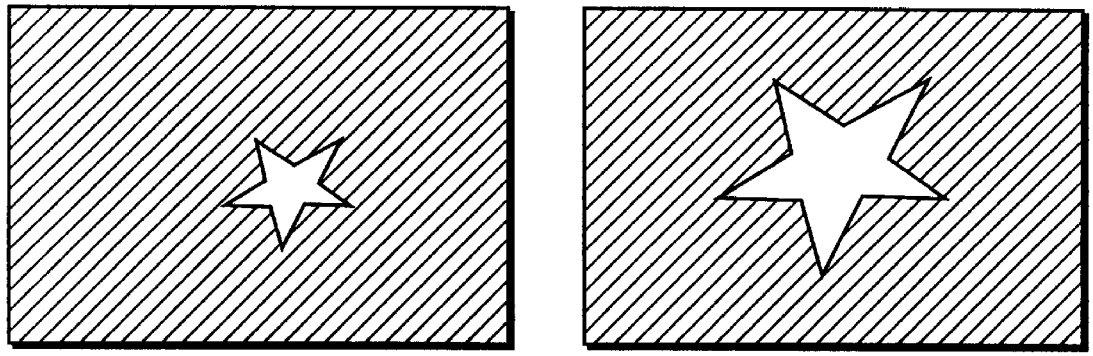
FIG. 7 shows input images having the same shape but having different sizes, which are used for an experiment.

In FIG. 6, there is shown a result of determining auto-correlations for 4 shapes, which indicates that 4 patters can be separated. Two same shaped patterns ☆ have identical values in the graph but three different shapes (☆, Δ, ○) can not match with each other in the graph, i.e., they can be separately recognized. In the graph of FIG. 6, each of 4 patterns has 5 plotted values at each resolution. In principle, every pattern must have 8 plotted values corresponding to 8 neighboring pixels, but in practice neighboring pixels symmetrically arranged relative to a remarkable pixel (i.e., neighboring pixels 1 and 8, 2 and 7, 3 and 6, 4 and 5) have identical correlation values and, therefore, values for independent pixels 1, 2, 3, 4 are indicated, omitting values for pixels 5, 6, 7, 8. In the graph of FIG. 6, the leftmost plotted value at every resolution is a correlation value based on a square of the remarkable pixel itself, which, in place of a product of the remarkable pixel value and each neighboring pixel value, is plotted for comparison with neighborhood correlation.

Figure 8:
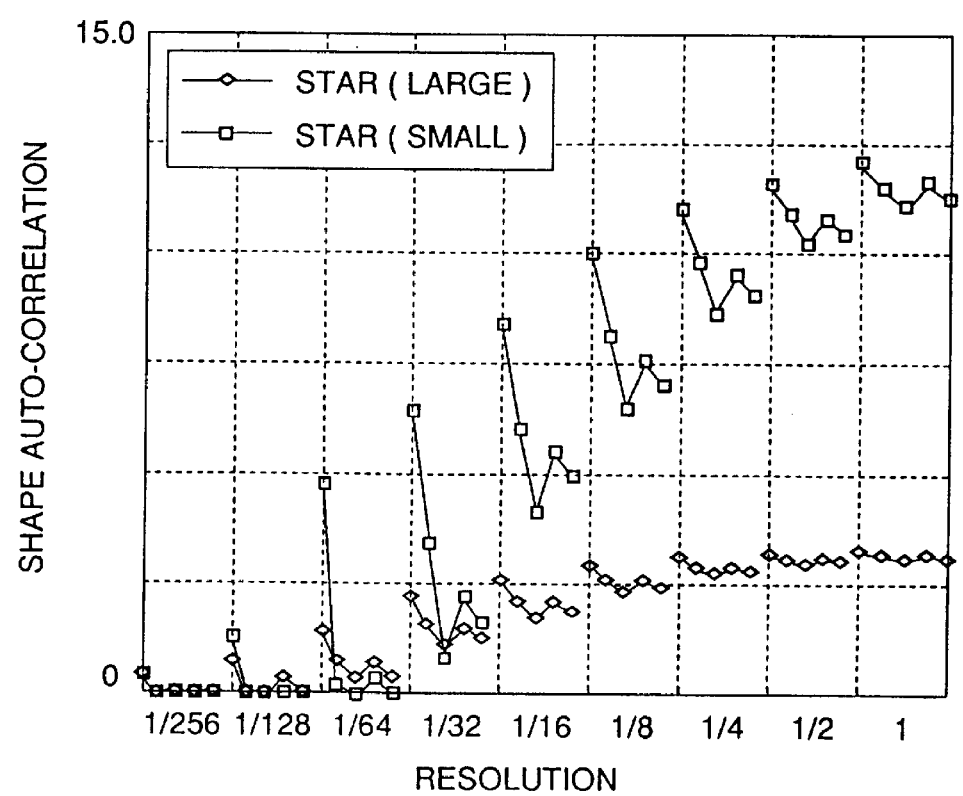
FIG. 8 is a graph showing a result of auto-correlation of 2 patterns used for an experiment.
Figure 9:
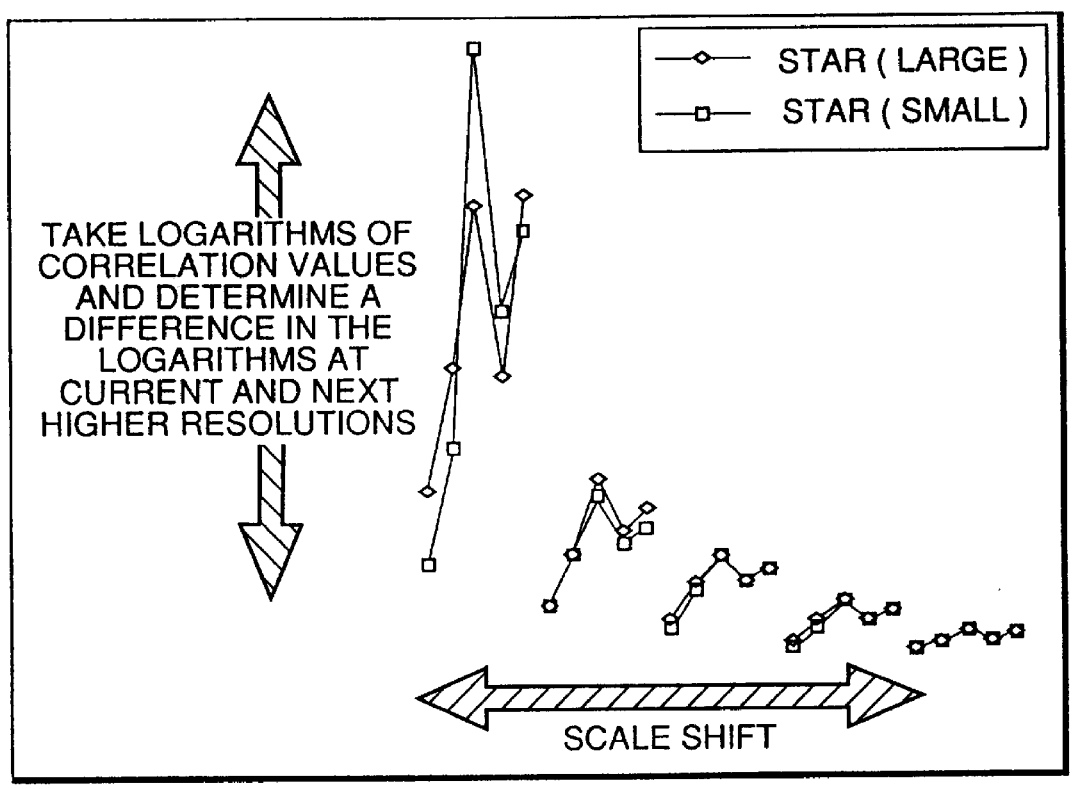
FIG. 9 is a graph showing a result obtained by determining the difference between images of different resolutions by using logarithms of shape auto-correlations.

The effectiveness of the shape auto-correlation is examined for recognizing two same shaped objects of different sizes. For this purpose, two patterns of stars having different sizes (i.e., large star and small star shown in FIG. 8) are used as an input image. As be seen from the graph of FIG. 8, direct comparison results in the shape auto-correlations for the two same shaped objects not matching each other. However, those two patterns can have almost identical values in the graph if a certain constant width $r_1=a, \ldots, r_n=$(square of a) is taken as a resolution range, a difference in logarithms of shape auto-correlations at current and next higher resolutions is determined and values for two patterns are plotted at a position matched by shifting in the direction of the horizontal axis for resolution scale. This indicates the possibility of recognizing a plurality of objects that are similar in shape but different in size. The shifting is effected by changing the resolution scale. Therefore, it requires only a small amount of calculation. In graphs of FIGS. 8 and 9 (like the graph of FIG. 6), 5 values are plotted at each resolution (i.e., 4 independent values for 4 of 8 neighboring pixels and 1 correlation value for the remarkable pixel itself).

Figure 10:
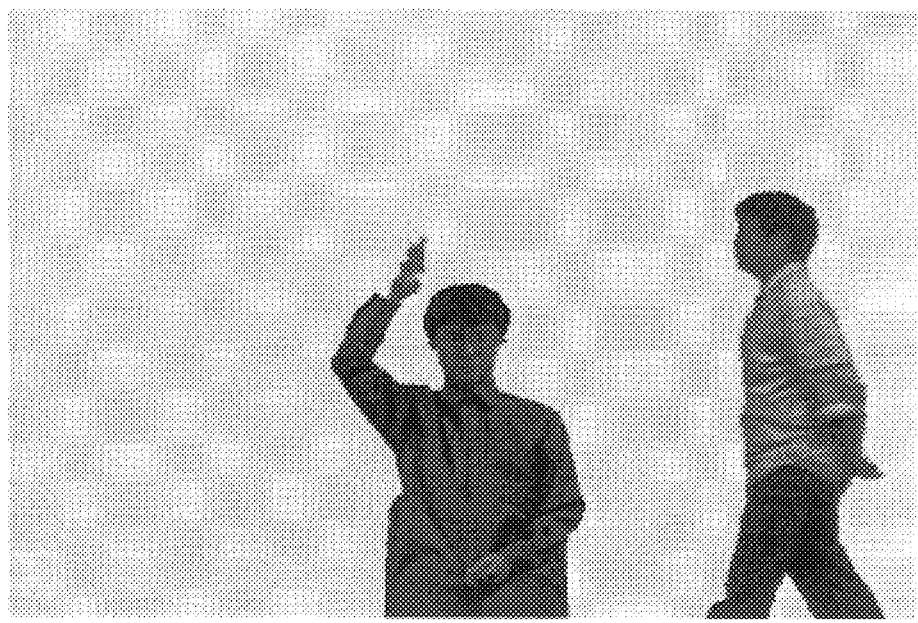
FIG. 10 shows an input image, actually taken by a camera, of two persons having different postures therein.

Using an actually taken image showing two persons coexisting therein (FIG. 10), an attempt was made to extract the two persons therefrom, recognize gestures of the two persons and detect the gravity center and area size of each object. However, the input image was compared with a previously taken background image to find out pixels similar in value to those of the background image and 0 is assigned to the found background pixels therein. Such simple background processing may usually induce considerable noise in the image. But, application of the invented image-recognition method achieved success in extracting two persons, detecting the gravity centers, calculating area sizes and recognizing postures of the persons (one person raising own hand and the other person standing erect in FIG. 10).

As is apparent from the foregoing, the present invention enables separation of the several objects, recognition of their shapes and simultaneous detection of relative positions and a plurality of objects.

These features are useful for recognizing, for example, several persons coexisting in an image and their positions and postures at the same time. Application of this image recognition method can further develop a human interface and monitoring systems.

We claim:

1. An image recognition method for recognizing an image comprising the steps of:

obtaining an input image;

generating, from the input image, a series of scaled-down images each having different resolutions, wherein each scaled-down image is comprised of a plurality of pixels;

performing neighborhood correlation on each of the scaled-down images;

isolating at least one object from the scaled-down images;

detecting a shape auto-correlation of the object; and comparing the shape auto-correlation of the object to a shape auto-correlation of a reference shape.

2. An image recognition method as defined in claim 1, wherein during the performing step:

storing coordinate information of pixels of the object, and simultaneously determining a shape feature of the object and position information of the shape feature from the coordinate information.

3. An image recognition method for recognizing an image comprising the steps of:

obtaining an input image;

generating, from the input image, a series of scaled-down images each having different resolutions, wherein each scaled-down image is comprised of a plurality of pixels;

performing neighborhood correlation on each of the scaled-down images;

isolating at least one object from the scaled-down images;

detecting a shape auto-correlation of the object;

adjusting the object's shape auto-correlation by taking the logarithm of the object's shape auto-correlation;

comparing the object's shape auto-correlation to a shape auto-correlation of a reference shape.

* * * * *